(12) United States Patent
Marb (10) Patent No.: US 12,522,483 B2
(45) Date of Patent: Jan. 13, 2026

(54) APPARATUS AND METHOD FOR AUTOMATICALLY DETERMINING THE MOVEMENT SPACE AND AUTONOMOUSLY OPTIMIZING THE DRIVING BEHAVIOR OF AN OPERATING AUTOMATED GUIDED VEHICLE COMPRISING LOADING IN DYNAMIC PRODUCTION AND LOGISTICS ENVIRONMENTS

(71) Applicant: GRENZEBACH MASCHINENBAU GMBH, Asbach-Baeumenheim (DE)

(72) Inventor: Philipp Marb, Rain (DE)

(73) Assignee: GRENZEBACH MASCHINENBAU GMBH, Asbach-Baeumenheim (DE)

( * ) Notice: Subject to any disclaimer, the term of this patent is extended or adjusted under 35 U.S.C. 154(b) by 176 days.

(21) Appl. No.: 17/799,173

(22) PCT Filed: Feb. 22, 2021

(86) PCT No.: PCT/DE2021/000034
§ 371 (c)(1),
(2) Date: Aug. 11, 2022

(87) PCT Pub. No.: WO2021/170166
PCT Pub. Date: Sep. 2, 2021

(65) Prior Publication Data
US 2023/0072148 A1    Mar. 9, 2023

(30) Foreign Application Priority Data
Feb. 26, 2020 (DE) ..................... 10 2020 001 255.8

(51) Int. Cl.
*B66F 9/06* (2006.01)
*B66F 3/35* (2006.01)
(Continued)

(52) U.S. Cl.
CPC ................ *B66F 9/063* (2013.01); *B66F 3/35* (2013.01); *B66F 17/003* (2013.01); *G05D 1/0251* (2013.01)

(58) Field of Classification Search
CPC .......... B66F 9/063; B66F 3/35; B66F 17/003; G05D 1/0251
See application file for complete search history.

(56) References Cited

U.S. PATENT DOCUMENTS

| 2011/0106362 A1 | 5/2011 | Seitz |
| 2014/0217343 A1 | 8/2014 | Sefrin |

(Continued)

FOREIGN PATENT DOCUMENTS

| DE | 202014000755 | 5/2015 | |
| DE | 102004047214 B4 * | 2/2016 | ........... G05D 1/0246 |

(Continued)

*Primary Examiner* — Rachid Bendidi
*Assistant Examiner* — Kirsten Jade M Santos
(74) *Attorney, Agent, or Firm* — DUANE MORRIS LLP; Gregory M. Lefkowitz; Randall C. Pyles (57) ABSTRACT

The invention relates to an apparatus and method for automatically determining the movement space of an operating automated guided vehicle and autonomously optimizing the driving behavior thereof comprising loading in dynamic production and logistics environments, comprising the following features: The automated guided vehicle, hereinafter referred to as AGV, carries cargo (11) by means of a lifting supporting plate (10), wherein monitoring spaces (35) are calculated according to the velocity of the vehicle, the position and properties of the cargo (11), and the direction of travel.

11 Claims, 5 Drawing Sheets

(51) Int. Cl.
     *B66F 17/00*     (2006.01)
     *G05D 1/00*      (2024.01)

(56)            References Cited

U.S. PATENT DOCUMENTS

2016/0167557 A1   6/2016   Mecklinger
2018/0141752 A1   5/2018   Nakanishi
2020/0189438 A1   6/2020   Zang

FOREIGN PATENT DOCUMENTS

DE       102018207202          7/2018
DE       102018104648          9/2019
EP          1854663 B1  *  11/2008   ............ B32B 27/08
EP          2952928         12/2015
JP       2017119451 A   *   7/2017   ............ B61B 13/00
KR        101319045 B1  *  10/2013   ........... G05D 1/0011
WO     WO2017197170 A1  *  11/2017   ............ A61B 34/30

\* cited by examiner

APPARATUS AND METHOD FOR AUTOMATICALLY DETERMINING THE MOVEMENT SPACE AND AUTONOMOUSLY OPTIMIZING THE DRIVING BEHAVIOR OF AN OPERATING AUTOMATED GUIDED VEHICLE COMPRISING LOADING IN DYNAMIC PRODUCTION AND LOGISTICS ENVIRONMENTS

The present invention relates to an apparatus and a method for automatically determining the movement space and autonomously optimizing the driving behavior of an operating automated guided vehicle comprising loading in dynamic production and logistics environments.

The used method differs from known methods in the following points. The ground is not scanned.

Not only are the dimensions of the vehicle in question considered, but also the cargo support dimensions.

No objects, for example humans or forklifts, are classified.

The determined data are not used for localization purposes, and the data are not recorded in a map.

No approach speed to specific objects is calculated, merely detection spaces and monitoring fields are calculated and optimized depending on the speed of the vehicle, the direction of travel, and the cargo.

No tracking of obstacles takes place.

Detection spaces and monitoring fields herein are not dependent on the environment. They are merely dependent on the particular loading state and on the current speed and direction of travel of the vehicle.

There is no robot-robot communication.

Reference is made at this juncture to document DE 10 2018 104 648 A1 as prior art.

This relates to a method and an apparatus between an industrial truck and at least one collision partner.

Industrial trucks, in particular forklifts, pose a risk to other vehicles and individuals in the vicinity that is not to be underestimated. This is due in particular to the great freedom of movement and dynamics as well as the relatively high speeds of forklifts. The partly automatic guidance of industrial trucks contributes further to the risk. Among accidents with forklifts, collisions with individuals are predominant and are associated with substantial injuries of the individuals in question.

Systems are provided on the market which define a protection zone around an industrial truck, wherein a warning is emitted should an individual enter the protection zone.

Within the scope of these systems, however, the protection zones are fixedly defined in an inflexible way. The systems are unable to distinguish between different collision partners located equidistantly from the industrial truck. Coalition partners who are located here directly in front of the industrial truck, for example in the direction of travel, and who are moving very quickly represent a much higher collision risk than collision partners past whom the industrial truck is expected to travel, since they are located to the side of the industrial truck.

The object of the present invention is to describe an apparatus and a method for operating an automated guided vehicle with optimized driving behavior by dynamic region monitoring of the driving region, wherein the dynamic behavior of any loading is taken into consideration.

This object is achieved by the features of claim 1

An apparatus for automatically determining the movement space of an operating automated guided vehicle and autonomously optimizing the driving behavior comprising loading in dynamic production and logistics environments, comprising the following features:

a) the automated guided vehicle, referred to hereinafter as AGV, carries cargo (11) by means of a lifting supporting plate (10), wherein monitoring spaces 35 are calculated according to the speed of the vehicle, b) a pressure-sensitive sensor plate (2) is located between at least one cargo support (1) and the lifting supporting plate (10), wherein the position of the cargo support 1 and of the center of gravity of the cargo load 11 on the AGV are detected, c) the AGV carries at least one or more 3D image sensors circumferentially, wherein the monitoring spaces 35 around the AGV are detected, d) the activators (19) integrated into the sensor plate 2 automatically stabilize the driving state of the entire AGV when the center of gravity of the load 11 is shifted dynamically, and additionally the behavior of the cargo (11) is recorded by means of pressure sensors (17) and, by means of one or more activators (19) filled with fluid, the cargo (11) located thereabove is raised or lowered as required, and wherein the activators (19) are operated via the assembly (27), and by the method as claimed in claim 4 a method for automatically determining the movement space of an operating automated guided vehicle and autonomously optimizing the driving behavior comprising loading in dynamic production and logistics environments, comprising the following features:

a) the entire space in front of, to the side of, and behind the AGV is monitored by means of 3D image sensors whilst the AGV is moving; certain spaces are connected in the direction of travel, b) as soon as an obstacle is identified in one of these spaces, the AGV initiates the calculated braking process, wherein no avoidance function is associated with this, c) the selected spaces are dynamically interpreted cyclically depending on the speed, the predicted and/or current direction of travel, position of the cargo support 1, the loading weight and the center of gravity of the cargo 11, of the AGV, a) the speed is adapted to the height and width and weight and center of gravity of the load 11 of the AGV, wherein the calculated monitoring spaces (35) are monitored cyclically by means of an intelligent algorithm on a computing unit (33) by at least one additional optical 3D image sensor.

In addition, it is claimed that the size of the monitoring spaces (35) changes with the change in the speed of the AGV in the same direction, and that with each cyclical run the calculation of the monitoring spaces (35) starts again, and that all data of the individual process portions of the AGV are transmitted via wireless data connections to the big-data and/or smart-data computer and memory (34) and are used for systemic data analysis, assessment and for interactive self-regulation of the transport and logistics process, and that a computer program with a program code in order to carry out the method steps when the program is run in a computer and a machine-readable support with the program code of a computer program in order to carry out the method when the program is run in a computer are provided.

Figure 1:
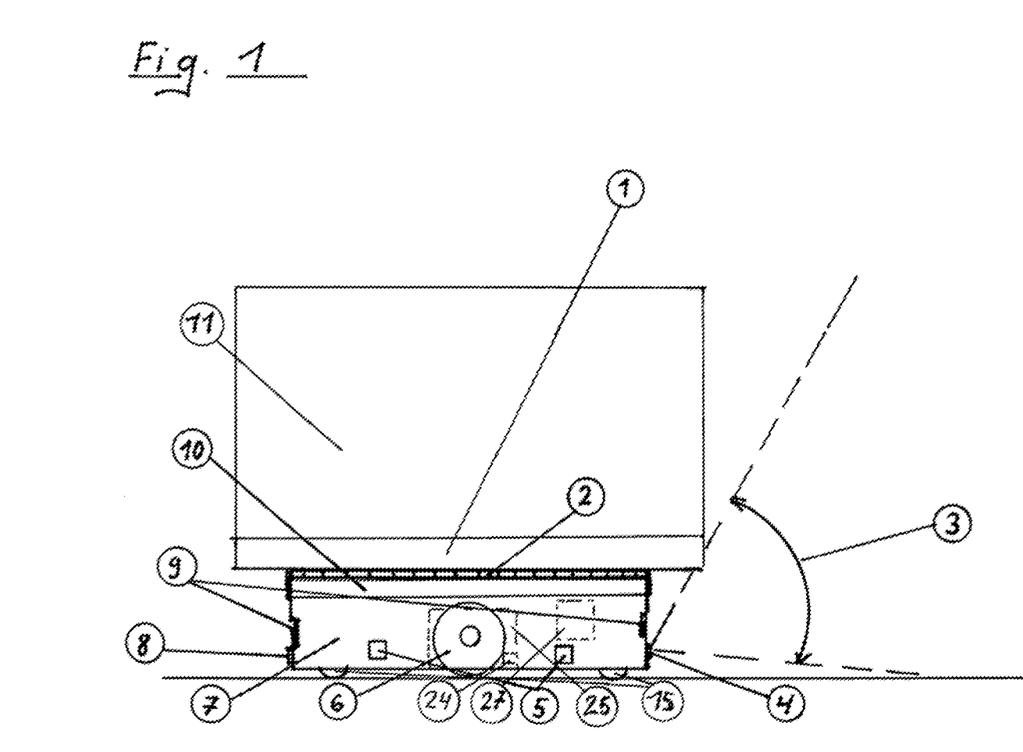
FIG. 1 a side view of the automated guided vehicle.

FIG. 1 shows, by way of example, a side view of a loaded automated guided vehicle, referred to hereinafter as AGV. Its drive wheels 6 and the support wheels 15 contact the ground and the cargo support 1 lies with the cargo 11 on the lifting supporting plate 10 of the AGV. A tactile pressure sensor plate 2 is located between the cargo support 1 and the lifting transporting plate and detects the loading state of the AGV. The activators (described later) integrated additionally in the sensor plate 2 serve to shift the center of gravity of the load in the driving states of the AGV. For example, when cornering and/or during acceleration maneuvers. The AGV can also be configured similarly to a forklift, in which case the tactile sensor plates 2 are fastened on the upper side of the lifting forks. The lateral image sensors 5 and the front and the rear image sensors 4 and 8 detect the driving region of the AGV. The detection serves to calculate the movement profile of the AGV. The horizontal detection region angle of the AGV of the monitoring field is shown at the image sensor 4. The lower outer edges of the cargo support 1 are detected by the image sensors 4, 5, 8, 13 attached on all sides of the AGV and provide additional information regarding the position and size of the cargo support on the AGV.

The front and rear laser scanners 9 are installed as an additionally prescribed safety device for personal protection.

Figure 2:
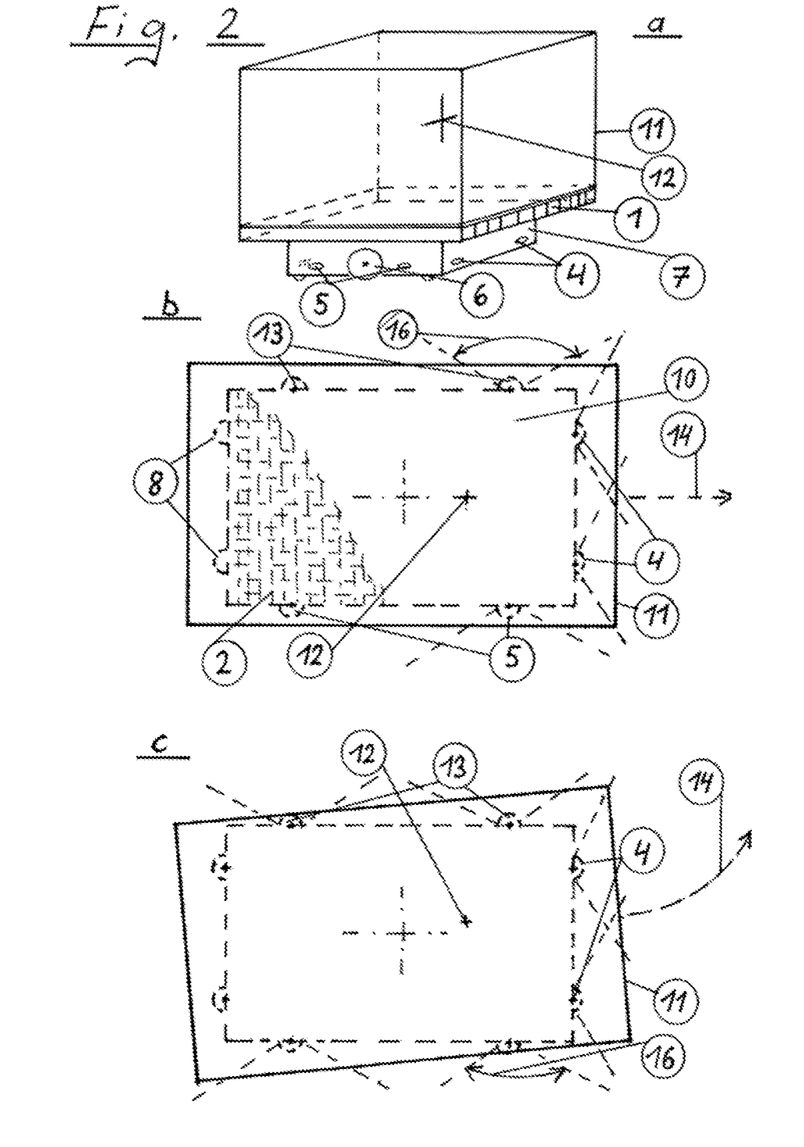
FIG. 2 a schematic representation and two schematic plan views of the automated guided vehicle in different loading states.

FIG. 2a shows a perspective illustration of the AGV with the cargo support 1 and the load 11 on the AGV. The image sensors 4, 5, the drive wheel 6, and the chassis 7 can also be seen. The center of gravity 12 shown here has been calculated by the drive data of the acceleration and deceleration of the AGV with the data of the pressure sensor plate 2. The center of gravity details are stored as additional information in the data record of the cargo for further transport. Due to the multiple pressure sensors 17 in the sensor mat 2 distributed so as to cover the entire area, a print pattern (footprint) is generated by each newly received cargo support 1 on the AGV. The type of cargo support 1 is determined on the basis of this print pattern by comparison of stored reference pattern data. Here, it is irrelevant whether the base of the cargo support 1 is larger or smaller than the area of the sensor mat 2; what is important is that the print of the cargo support 1 is clearly imaged on the sensor mat 2. Parameters regarding transport properties are stored for each cargo support type in the AGV computer 33 and the computer of the overall controller 34 and are taken into consideration in the driving calculations of the AGV.

The current print pattern with the reference pattern can also be used to detect damage to the cargo support 1.

FIG. 2b shows the cargo 11 in a plan view with the AGV arranged below moving in a direction of travel along a straight line. When travelling straight ahead, the image sensors 4, 5, 13 are active for driving region detection in order to calculate the movement profile with the driving instructions of the AGV. The tactile sensor plate 2 with the activators is shown in part for reasons of clarity. The center of gravity 12 of the load 11 in this case lies in the front region of the AGV support plate 10. The AGV may thus accelerate more strongly in the direction of travel. In order to optimize the braking process, the front activators in the tactile sensor mat are active. The load is thus raised slightly in the front region of the support plate 10, and the center of gravity 12 shifts rearward. This prevents a shift in position of the cargo support 1 with the load 11 on the AGV.

FIG. 2c shows a shifted cargo 11 in a plan view with the AGV located beneath. The shifted cargo 11 is stabilized by the pressure sensors 17 and actuator 19 system in all driving maneuvers and prevents a shift in position of the cargo support 1 with the cargo load 11 on the AGV. For example, when cornering to the left, the image sensors 4, 13 are active for detection of the driving region. Due to the shifted cargo 11, the monitoring spaces 35 are also dynamically adapted.

In the event of a displacement of the support plate 10, in this case the center of gravity 12 of the load 11 lies in the front region of the support plate 10. A left-hand curve can thus be navigated at higher speed than a right-hand curve. In order to optimize navigation of a right-hand curve, the left-side activators in the tactile sensor mat are active. The load in the left region of the support plate 10 is thus raised slightly, and the center of gravity 12 shifts to the right. The AGV can thus navigate the right-hand curve with optimized speed.

FIG. 3a shows, in a schematic illustration in a plan view, the recording of the entire monitoring spaces 35 of the 3D image sensors 4 and 14.

FIG. 3b shows an omnidirectional evaluation of the monitoring spaces 35 depending on the direction of movement, in our example a transverse movement to the left, the speed, the size of the cargo support, and the position of the cargo support on the AGV. The shown arrows are, at this moment in time, active motion vectors of the AGV.

Only the regions of the monitoring spectrum that are required during travel of the AGV are evaluated. The shown 3D image sensors 4, 13 are shown at these positions merely by way of example. More or fewer 3D image sensors may also be used at other positions, or movable, automatically pivotable 3D image sensors. The amount of data is thus reduced for quicker assessment of the movement space by the AGV. Due to the dynamic adaptation, the monitoring spaces can be made smaller and more flexible, whereby the AGV can navigate narrow lanes. In the case of the normal 3D image sensors (CCD for charge-coupled device, CMOS/APS Active Pixel Sensor Stereo sensors), only schematic three-dimensional images with depth information of the environment are stored and evaluated, thus resulting in a simple distinction of objects sufficient for cause analysis and diagnosis. In order to improve the quality of the analysis, graph light sensors can be used instead of the normal 3D stereo image sensors (CCD, CMOS). These allow 3D images to be recorded with high quality for improved analysis of the monitoring fields of the driving region. Graphene light sensors have a light sensitivity 1000 times greater than conventional light sensors and, due to their layered structure, allow the recording of high-resolution, three-dimensional images of the detected space in real time.

FIG. 4a shows the tactile sensor mat 2 with an exemplary arrangement of the sensors 17 and activators 19. For reasons of clarity, only one quadrant of the sensor mat has been shown. What is visible is an exemplary arrangement of the control lines 18 to the activators 19 and the assembly 27 for operating the activators with the control unit 28. The activators 19 connected to the control line 18 each form a circuit. In another embodiment of the sensor mat 2, the activators 19 can also be controlled individually.

FIG. 4b shows a section through the sensor mat 2 in the region of an activator and a sensor in the inactive state of the activator. On the right side of the activator there is located the pressure sensor 17. The activator lifting element is compressed by the cargo support 1 located on the upper side of the lifting element 21, said cargo support acting on the pressure sensor 17 in the vertical direction.

The pressure sensor 17 is selected for example as a piezo pressure sensor. Other sensors may also be selected and/or other tactile mats can be used with other methods. The fluid chamber 23 is located between the upper side 21 and the underside 20 and is connected to the control line 18. The underside 20 of the activator 19 is connected to the lifting support plate 10 of the AGV.

FIG. 4c shows the chamber 23 of the activator 19 in an extent upwardly in the vertical direction, said chamber being filled with fluid 22 by the control line 18. The cargo support 1 located thereabove is thus raised and, as described in FIG. 2, the position of the center of gravity 12 of the load 11 on the AGV may thus shift. The sensor mat, in the region of the activators 19, particularly the upper side of the lifting element 21, consists of a stable elastic material with anti-slip effect, for example made of a rubber—or silicone—mixture, or of other materials which have these properties.

In addition, moisture sensors 26 are mounted on the upper side of the sensor mat 2. These sensors 26 detect the loss of liquids in the load, for example in the event of damage to liquid containers in the cargo.

Figure 5:
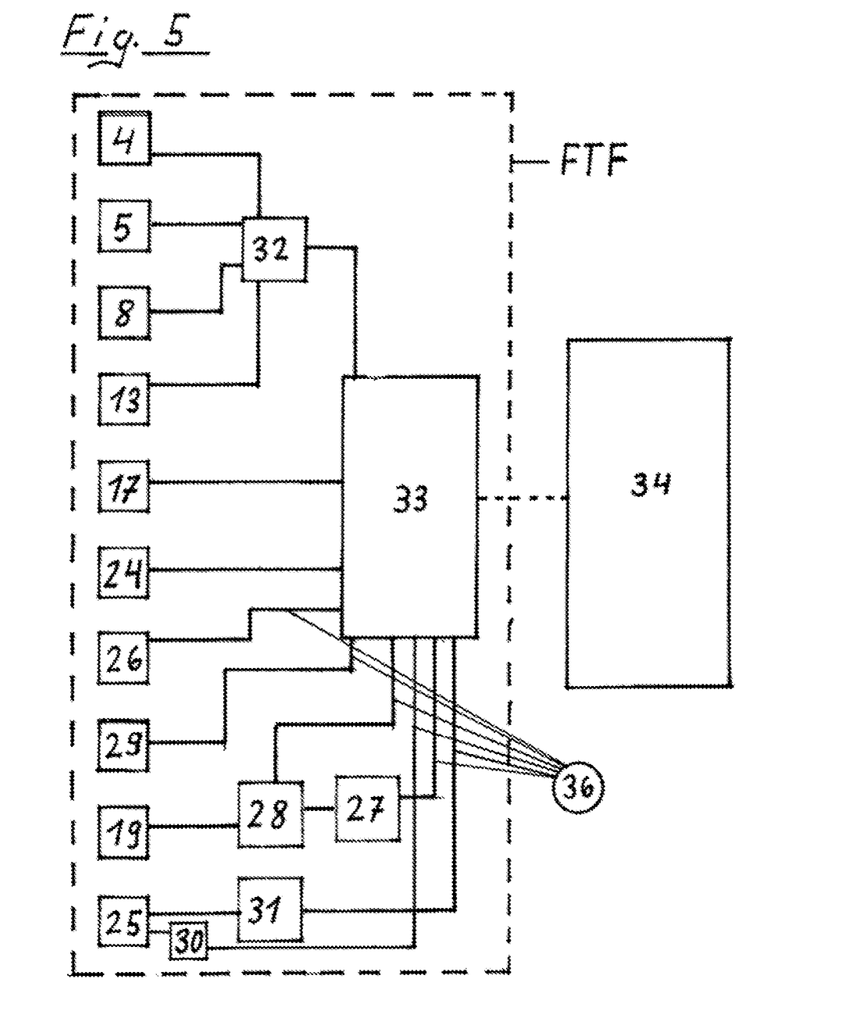
FIG. 5 a block diagram of all relevant components of automated guided vehicle systems.

FIG. 5 shows a block diagram of all relevant components of the driving and transport process of the AGV with the data connections and control connections 36 to the data processing modules in and outside the AGV. The components installed in the AGV are surrounded by the frame marked by a dashed line.

The data of the image sensors 4, 5, 8, 13 installed in the AGV are sent via the data lines 36 to the image processing and control module 32.

The image processing and control module 32 extracts the image information as depth information in a schematic image and forwards it to the computer 33 for analysis and diagnosis.

The data of the pressure sensors 17 of the tactile sensor mat 2 are forwarded, for evaluation at a control unit (not shown for reasons of clarity), to the computer 33 by means of the data line 36. They give information as to the type and position of the cargo support 1 on the AGV and serve to calculate the center of gravity of the load 11.

The data of the rpm counter 24 on the main drive wheels 6 is forwarded via the computer 33 to the control module 31 for calculation of the distance and speed.

Figure 4:
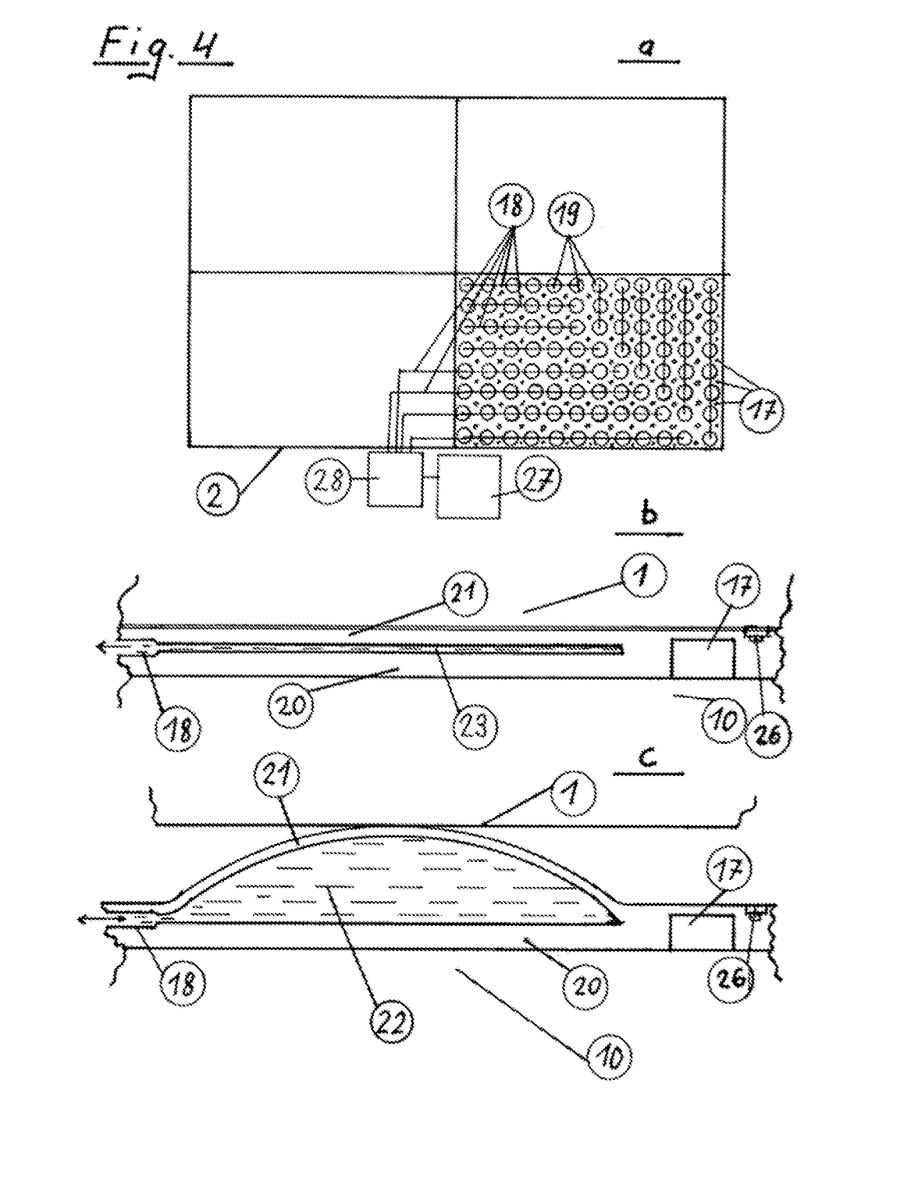
FIG. 4 the representation of the activators according to the invention.

The moisture sensor 26 serves as a safety device for monitoring the load 11, as described in FIG. 4. The signals of said sensor are transmitted directly to the computer 33.

The battery sensor unit 29 monitors the operating temperature and the state of charge of the power supply unit of the AGV.

The activators 19 are operated via the assembly 27 and the control unit 28. They also connected to the computer 33 for data exchange and for control purposes. The drive unit 25 is controlled with the control module 31 by the computer 33.

The sensor 30 forwards the data of the operating temperature of the drive unit 25 to the computer 33 for evaluation.

Figure 3:
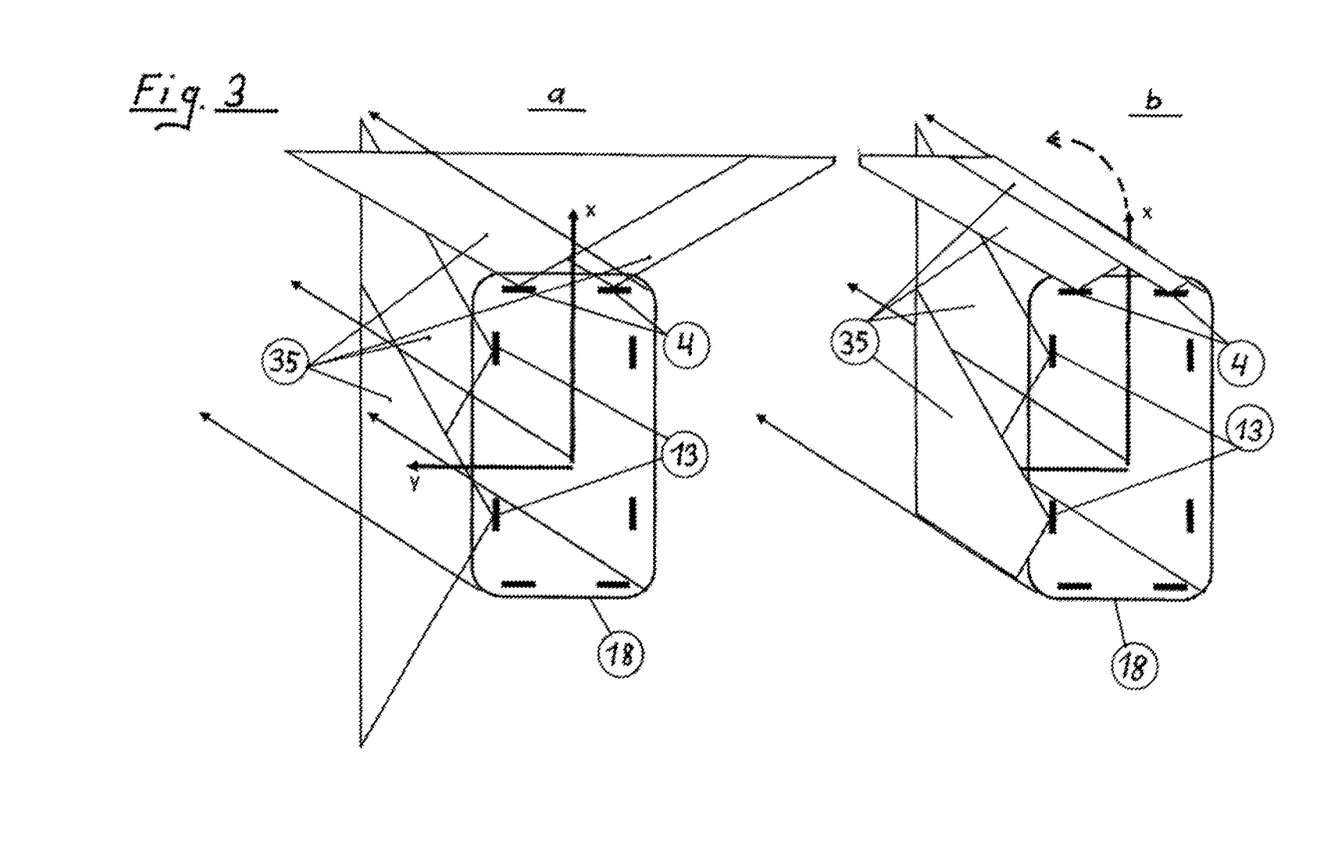
FIG. 3 a schematic representation in plan view of the monitoring spaces.

The evaluation of the image data by the image processing and control module 32 and the evaluation of the data of the pressure sensors 17 by the computer 33 provide the determination of the size of the monitoring fields as described in FIG. 3.

The superordinate management system 34 coordinates the driving instructions of the AGV with the production sequences and the resultant transport requirements.

The management system 34 forwards the driving instructions directly to the computer 33 of the AGV wirelessly via radio. The driving instruction is now compared in the computer 33 with the parameters of the load and the driving region, thus resulting in the ACTUAL driving instruction of the AGV consisting of direction of travel, speed and control of the activators.

All data of the AGV are collected in the memory of the data processing unit of the management system 34, referred to as a big-data and smart-data approach, and are supplied as extracted data by a systematic data analysis program followed by an assessment system to the production and logistics data record and are used for active open-loop and closed-loop control and for interactive self-regulation by special programs of the entire process.

REFERENCE SIGNS 1. cargo support
2. tactile sensor mat with integrated activators
3. horizontal detection angle of the monitoring field of sensor 4
4. front stereo image sensor
5. right lateral stereo image sensor
6. right main drive wheel
7. AGV lower chassis and framework
8. rear stereo image sensor
9. laser scanner
10. AGV lifting supporting plate
11. cargo, cargo load
12. center of gravity of the load
13. left lateral stereo image sensor
14. representation of direction of travel
15. support wheels
16. vertical detection angle
17. pressure sensor
18. control line for activator 19
19. activator, lifting element
20. underside of lifting element of the activator 19
21. upper side of lifting element of the activator 19
22. fluid
23. fluid chamber
24. speed measurement sensor
25. AGV drive and brake unit
26. moisture sensor
27. assembly for operating the activators
28. control unit of the activators
29. battery sensor
30. temperature sensor of the drive unit 25
31. controller of the drive unit
32. image processing and controller of the 3D image sensors, stereo image sensors
33. computer for data processing, analysis, diagnosis and control in the AGV
34. computer for data processing with AI, memory, automated guidance management system and overall controller outside the AGV
35. monitoring space, monitoring fields, detection space
36. schematic illustration of data and control connections

The invention claimed is:

1. An apparatus for automatically determining movement space of an operating automated guided vehicle (AGV) and autonomously optimizing driving behavior with loading in dynamic production and logistics environments, comprising:
- a cargo support that supports a cargo load
- a lifting supporting plate that carries the cargo support on the AGV, wherein monitoring spaces are calculated according to a speed of the AGV
- a pressure-sensitive sensor mat including an elastic material located the cargo support and the lifting supporting plate that detects a position of the cargo support and of a center of gravity of the cargo load on the AGV
- 3D image sensors located circumferentially around the AGV to detect the monitoring spaces around the AGV
- an array of activators integrated into the pressure-sensitive sensor mat with an underside connected to a top surface of the lifting support plate that automatically stabilize the cargo load and a driving state of the AGV by being raised or lowered with a fluid in a fluid chamber of one or more of the activators when the center of gravity of the cargo load shifts
- wherein behavior of the cargo load is recorded by pressure sensors of the pressure-sensitive mat and by the activators filled with the fluid, and the cargo load located thereabove is raised or lowered as required.

2. The apparatus as claimed in claim 1, wherein the activators are operated in a fluid circuit including a controller and corresponding control lines.

3. A method for automatically determining movement space of an operating automated guided vehicle (AGV) and autonomously optimizing driving behavior including loading in dynamic production and logistics environments, comprising:
- monitoring spaces in front of, to the side of, and behind the AGV by 3D image sensors whilst the AGV is moving; certain spaces are connected in the direction of travel,
- initiating a braking process as soon as an obstacle is identified in one of the certain spaces, wherein no avoidance function is associated with this
- dynamically interpreting the certain spaces depending on a speed, a predicted and/or current direction of travel, position of a cargo support, a loading weight, and a center of gravity of cargo on the cargo support, of the AGV
- adapting the speed to a height, a width, a weight, and the center of gravity of the cargo, wherein the monitoring spaces are monitored cyclically using an intelligent algorithm on a computer and at least one additional optical 3D image sensor
- the center of gravity is automatically stabilized by raising or lowering activators that are integrated in an array of a pressure sensor mat including an elastic material on top of a lifting support plate under the cargo support with a fluid in a fluid chamber of one or more activators when the center of gravity of the cargo shifts
- wherein behavior of the cargo load is recorded by pressure sensors of the pressure-sensitive mat and by the activators filled with the fluid, and the cargo load located thereabove is raised or lowered as required.

4. The method as claimed in claim 3, wherein a size of the monitoring spaces changes with a change in the speed of the AGV in the same direction.

5. The method as claimed in claim 4, wherein with each cyclical run, calculation of the monitoring spaces starts again.

6. The method as claimed in claim 5, wherein data of individual process portions of the AGV are transmitted via a wireless data connection to the computer and memory and is used for systemic data analysis, assessment, and for interactive self-regulation of the transport and logistics process.

7. A non-transitory computer-readable medium including executable instructions that when executed by a processor cause the processor to perform the method steps as claimed in claim 3.

8. The apparatus as claimed in claim 1, wherein each activator of the array of activators is controlled individually by a computer.

9. The apparatus as claimed in claim 1, wherein the elastic material has an anti-slip effect.

10. The apparatus as claimed in claim 1, further comprising a moisture sensor on an upper side of the pressure-sensitive sensor mat.

11. The method as claimed in claim 3, wherein the elastic material has an anti-slip effect.

* * * * *